United States Patent
Butz

(10) Patent No.: US 8,349,925 B2
(45) Date of Patent: Jan. 8, 2013

(54) FLAME-RETARDANT COMPOSITION COMPRISING A PHOSPHONIC ACID DERIVATIVE

(75) Inventor: Volker Butz, Neustadt/Weinstraße (DE)

(73) Assignee: THOR GmbH, Speyer (DE)

( * ) Notice: Subject to any disclaimer, the term of this patent is extended or adjusted under 35 U.S.C. 154(b) by 0 days.

(21) Appl. No.: 12/737,924

(22) PCT Filed: Sep. 4, 2009

(86) PCT No.: PCT/EP2009/061489
§ 371 (c)(1),
(2), (4) Date: May 16, 2011

(87) PCT Pub. No.: WO2010/026230
PCT Pub. Date: Mar. 11, 2010

(65) Prior Publication Data
US 2011/0257310 A1    Oct. 20, 2011

(30) Foreign Application Priority Data
Sep. 5, 2008  (EP) .................................. 08163790

(51) Int. Cl.
C08K 5/34 (2006.01)
C08K 5/3492 (2006.01)

(52) U.S. Cl. ........................................ 524/101; 524/100
(58) Field of Classification Search ................... 524/101
See application file for complete search history.

(56) References Cited

U.S. PATENT DOCUMENTS

| 4,257,931 | A | * | 3/1981 | Granzow | 524/100 |
| 5,837,760 | A | * | 11/1998 | Hackl et al. | 524/127 |
| 6,090,345 | A | * | 7/2000 | Holzner et al. | 422/15 |
| 6,599,963 | B2 | * | 7/2003 | Horsey et al. | 524/100 |

FOREIGN PATENT DOCUMENTS

| EP | 0 617 079 A2 | 3/1994 |
| EP | 0 889 085 A2 | 6/1998 |
| WO | WO2005/113661 | 12/2005 |

OTHER PUBLICATIONS

Zhu et al., Journal of Applied Polymer Science, vol. 62, 2267-2280, 1996.*
Reshetnikov et al., Polymer Degradation and Stability, 54, 137-141, 1996.*

* cited by examiner

*Primary Examiner* — Hui Chin
(74) *Attorney, Agent, or Firm* — Hedman & Costigan, P.C.; James V. Costigan

(57) ABSTRACT

The present invention relates to a flame-retardant composition that comprises a synergistic flame-retardant mixture, and a method for flame-retarding a polymer by adding the flame-retardant composition. The invention further relates to polymers that contain said flame-retardant composition.

11 Claims, No Drawings

FLAME-RETARDANT COMPOSITION COMPRISING A PHOSPHONIC ACID DERIVATIVE

The present invention relates to a flame-retardant composition that comprises a synergistic flame-retardant mixture, and a process for flame-retarding a polymer by adding this flame-retardant composition. The invention further relates to polymers that contain said flame-retardant composition.

Today, polymers are frequently made flame-retardant by adding phosphorus- or halogen-containing compositions or mixtures to them. Mixtures of phosphorus- and nitrogen-containing compounds are now often used as flame-retardant agents. A problem usually accompanying this is that the flame-retardant effect is too weak or the thermal stability of the resulting flame-retardant plastic is too low.

Furthermore, salts of phosphinic acids have been shown to be effective flame-retardant additives for polymers, and in such cases, both alkali metal salts (DE-A 2 252 258) and salts of other metals (DE-A 2 447 727) are used. These flame-retardant additives produce minor changes in the thermal properties of the plastic, but they still show an insufficient flame-retardant effect.

The market for flame-retardant agents currently includes products that act by interfering with all combustion processes through chemical or physical processes. In this case, it has been shown that during the combustion of an object, these agents act either in the gas phase, the condensed phase, or in both phases. It is assumed that e.g. organic halogen forms (such as decabromodiphenyl oxide, hexabromocyclodecane (HBCD), and tetrabromobisphenol A) produce hydrogen halide (HX), which interacts with the free radical organic "fuel" from the polymer substrate.

Synergists for reaction with HX have been suggested in order to form additional chemical species which interfere with combustion in the gas phase, such as a reaction of antimony oxide with HX in order to generate antimony halide and hydrogen. Antimony compounds such as antimony trioxide also act as radical scavengers in combination with halogen compounds. This can inhibit spreading of the fire. Although antimony compounds and the typical halogen compounds are efficient with regard to the cost-performance ratio, there have recently been numerous concerns about toxicity of the byproducts that form during combustion in the presence of a halogenated flame-retardant agent. Furthermore, antimony oxides often contain trace amounts of arsenic compounds which are suspected of being carcinogenic. Due to said disadvantages of these compounds, efforts are currently underway to replace antimony trioxide and bromine compounds in current commercial flame-retardant applications. However, it is highly difficult to provide a substitute flame-retardant agent that is not only environmentally friendly but also highly efficient.

A further reason for adding flame-retardant compositions to polymers is to prevent dripping of parts of the polymer in the form of droplets as an effect of the fire. These droplets quite often catch fire themselves and constitute a major hazard with respect to spreading of a fire. Therefore, a common measure is to add filling agents such as talcum powder to the polymer in large amounts, which gives rise to certain disadvantages concerning the mechanical properties of the polymer. The filling materials used in this case include calcium carbonate, magnesium carbonate, zinc borate, silicates, silicones, glass fibers, glass beads, asbestos, kaolin, barium sulfate, calcium sulfate, metal oxides, hydrides and hydroxides such as zinc oxide, magnesium hydroxide, aluminum oxide trihydrate, silicon dioxide, calcium silicate, and magnesium silicates.

A publication that deals with the use of diphosphonates as flame-retardant compounds is U.S. Pat. No. 4,174,343. This document discloses a large number of diphosphonates, which are said to have flame-retardant properties in various polymers and copolymers.

Furthermore, hindered amines, which have long been used as light or thermal stabilizers for a large number of organic materials that are susceptible to decomposition due to oxygen, heat, and actinic light have recently been discussed as flame-retardant agents. Specifically, these are various N-hydrocarbon oxy-substituted inhibited amines (so-called NR inhibited amines). For example, DE-T 69826477 discloses NR hindered amines of this type that are said not only to have UV-stabilizing but also flame-retardant properties.

With respect to prior art, the purpose of the invention is to provide an additional highly-efficient and thermally stable flame-retardant composition. The components of the flame-retardant composition according to the invention must not adversely affect the thermal processability of a plastic that has been made flame-retardant even at elevated temperatures in the range of approx. 250 to 300° C. Moreover, the components of these flame-retardant compositions should interact synergistically and therefore be suitable for concomitant use at lower concentrations compared to those required in the case of individual components. The flame-retardant composition according to the invention should also be free of organic halogen compounds and heavy metals, thus preventing exposure to toxic substances.

The invention achieves this purpose by comprising a blend or a flame-retardant composition containing a synergistic mixture of (A) and (B), which denote the following:

(A) is a compound or a mixture of 2 or more chemical compounds selected from the group consisting of
  a) one or more phosphonate compound(s) of the Formula

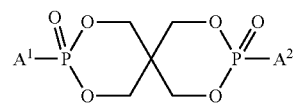

where $A^1$ and $A^2$ independently denote a substituted or unsubstituted, straight or branched chain alkyl group having 1 to 4 carbon atoms, substituted or unsubstituted benzyl, substituted or unsubstituted phenyl, or substituted or unsubstituted naphthyl, and
  b) one or more phosphonate compound(s) of the following Formula

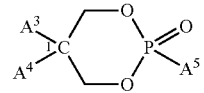

where $A^3$ and $A^4$ independently denote methyl or ethyl and $A^5$ denotes a straight or branched chain alkyl group having 1 to 4 carbon atoms or a phenyl or benzyl group having up to 3 methyl groups respectively, and
  c) alkyl or arylphosphonic acids, where alkyl denotes a straight or branched chain alkyl group having 1 to 4 carbon atoms, and aryl denotes a substituted or unsubstituted benzyl, substituted or unsubstituted phenyl, substituted or unsubstituted naphthyl, or a salt or ester of the aforementioned phosphonic acid, and (B) a 1,3,5-triazine compound or a mixture of two or more 1,3,5-triazine compound(s) selected from tris-2-hydroxyethyl isocyanurate, melamine, melamine cyanurate, melamine phosphate, poly-[2,4-(piperazin-1,4-yl)-6-(morpholin-4-yl)-1,3,5-triazine], dimelamine phosphate, melamine pyrophosphate, and hindered amine compounds of Formula I, II, IIA, and III:

$$R_1NH-CH_2CH_2CH_2NR_2CH_2CH_2NR_3CH_2CH_2CH_2NHR_4 \quad (I)$$

$$T-E_1-T_1 \quad (II)$$

$$T-E_1 \quad (IIA)$$

$$G-E_1-G_1-E_1-G_2 \quad (III),$$

where in the tetraamine of Formula I $R_1$ and $R_2$ denote the s-triazine moiety E, and one of $R_3$ and $R_4$ denotes the s-triazine moiety E, with the other of $R_3$ or $R_4$ denoting a hydrogen, E denotes

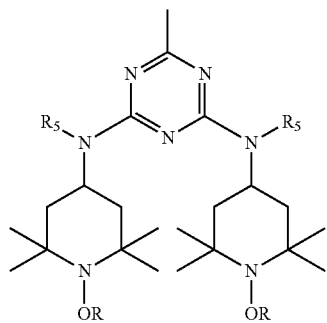

R denotes methyl, cyclohexyl or octyl, $R_5$ denotes an alkyl having 1 to 12 carbon atoms, where in the compound of Formula II or IIA, if R denotes cyclohexyl or octyl, each of T and $T_1$ denotes a tetraamine substituted by $R_1$-$R_4$ as defined in Formula I, where (1) one of the s-triazine moieties E in each tetraamine is replaced by the group $E_1$, which forms a bridge between two tetraamines T and $T_1$, or (2) the group $E_1$ can have both terminals in the same tetraamine T as in Formula IIA, where two of the E moieties of the tetraamine are replaced by one $E_1$ group, or (3) all three s-triazine substituents of tetraamine T can denote $E_1$, such that one $E_1$ residue comprises the bond between T and $T_1$ and a second $E_1$ residue has both terminals in tetraamine T, and $E_1$ denotes

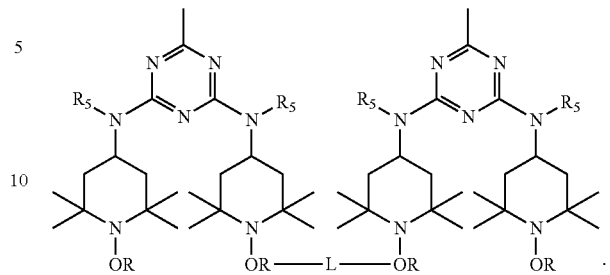

The blend itself may already be a flame-retardant composition, or in combination with other components to be specified below, constitute a flame-retardant composition.

According to a general embodiment of the invention, compound (B) may be one or more 1,3,5-triazine compound(s) selected from tris-2-hydroxyethyl isocyanurate, melamine, melamine cyanurate, melamine phosphate, poly-[2,4-(piperazin-1,4-yl)-6-(morpholin-4-yl)-1,3,5-triazine], dimelamine phosphate, melamine pyrophosphate and hindered amine compounds of the Formula I, II, III, IV, V, VI, VII, VIII, IX, X, or XI,

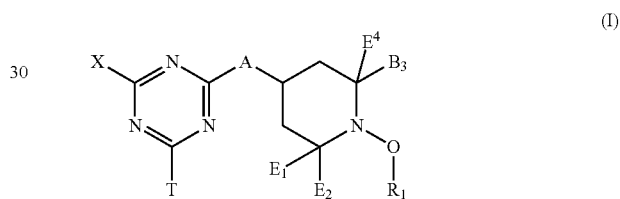

(I)

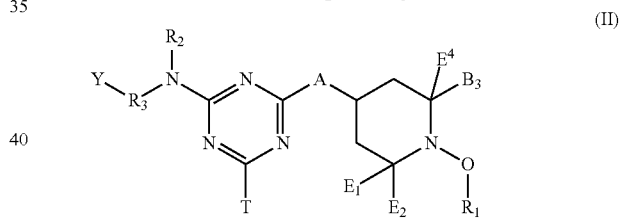

(II)

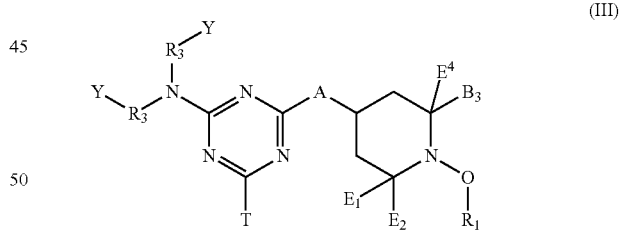

(III)

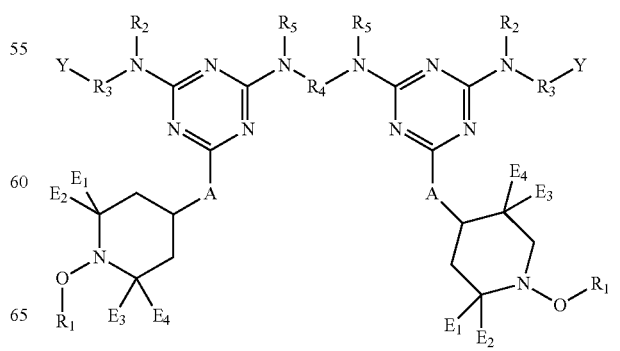

(IV)

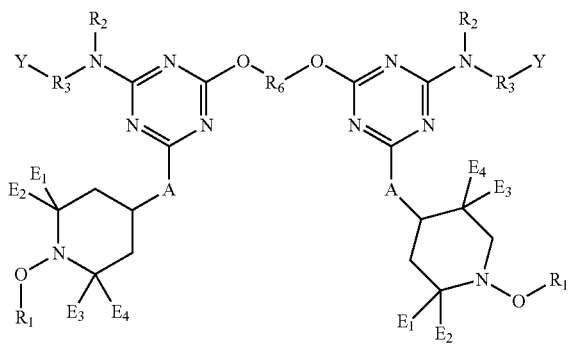

(V)

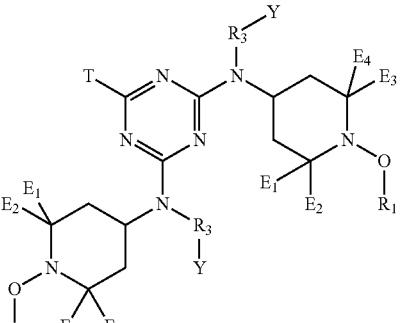

(IX)

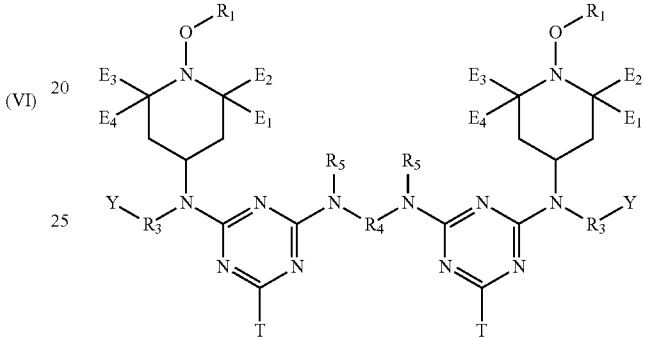

(X)

(VI)

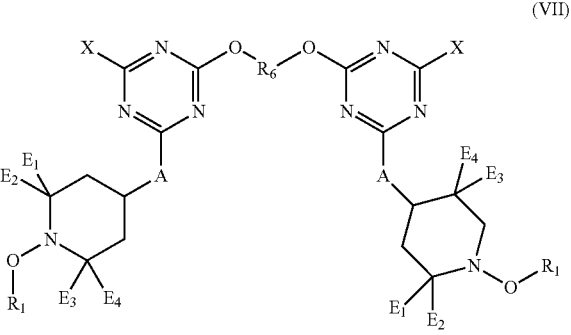

(VII)

(XI)

(XIII)

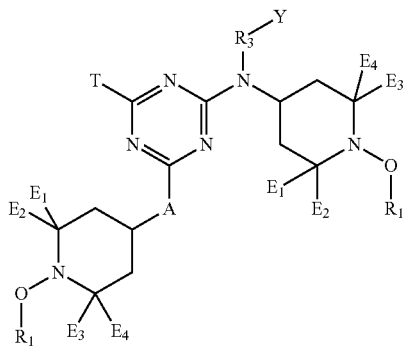

where in the case of a blend in (A), the components of the blend may be several, 2 or 3 compounds selected from the group (a), (b), and (c), and where the symbols have the following meaning:

$E_1$, $E_2$, $E_3$, and $E_4$ independently denote a linear or branched chain alkyl having 1 to 4 carbon atoms, or $E_1$ and $E_2$ independently denote an alkyl having 1 to 4 carbon atoms, and $E_3$ and $E_4$ taken together denote pentamethylene, or $E_1$ and $E_2$, and $E_3$ and $E_4$ each taken together denote pentamethylene, $R_1$ denotes a linear or branched chain alkyl having 1 to 18 carbon atoms, a cycloalkyl having 5 to 12 carbon atoms, a bicyclic or tricyclic hydrocarbon residue having 7 to 12 carbon atoms, a phenyl alkyl having 7 to 15 carbon atoms, an aryl having 6 to 10 carbon atoms, or said aryl substituted by 1 to 3 alkyls having 1 to 8 carbon atoms, $R_2$ denotes hydrogen or a linear or branched chain alkyl having 1 to 12 carbon atoms, $R_3$ denotes an alkylene having 1 to 8 carbon atoms, or $R_3$ denotes —C(O)—, —C(O)—$R_4$—, —C(O)$NR_2$—, or —C(O)—$NR_2$—$R_4$—, $R_4$ denotes an alkylene having 1 to 8 carbon atoms,
$R_5$ denotes hydrogen, a linear or branched chain alkyl having 1 to 12 carbon atoms, or

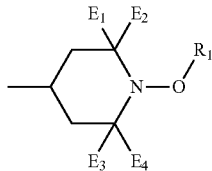

or when $R_4$ denotes ethylene, two $R_5$ methyl substituents may be linked by a direct bond so that the triazine bridging group —$N(R_5)$—$R_4$—$N(R_5)$— denotes a piperazine-1,4-diyl moiety, $R_6$ denotes alkylene having 2 to 8 carbon atoms, or $R_6$ denotes

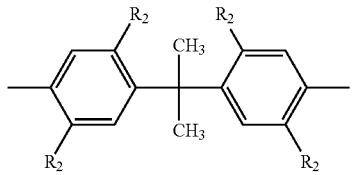

with the proviso that Y is not —OH when $R_6$ has the structure depicted above,

A denotes —O— or —$NR_7$—, where $R_7$ denotes hydrogen, a straight or branched chain alkyl having 1 to 12 carbon atoms, or $R_7$ is

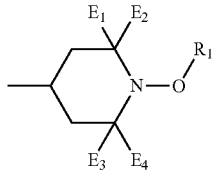

T denotes phenoxy, a phenoxy substituted by one or two alkyl groups having 1 to 4 carbon atoms, an alkoxy having 1 to 8 carbon atoms or —$N(R_2)_2$ with the stipulation that $R_2$ is not hydrogen, or T denotes

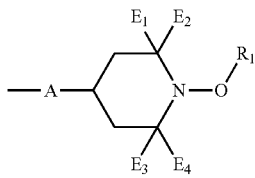

X denotes —$NH_2$, —NCO, —OH, —O-glycidyl, or —$NHNH_2$, and

Y denotes —OH, —$NH_2$, or —$NHR_2$ where $R_2$ is not hydrogen; or Y denotes —NCO, —COOH, oxiranyl, —O-glycidyl, or —$Si(OR_2)_3$; or the combination $R_3$—Y— denotes $CH_2CH(OH)R_2$, where $R_2$ denotes an alkyl or said alkyl interrupted by one to four oxygen atoms, or $R_3$—Y— denotes $CH_2OR_2$; or where the hindered amine compound denotes a mixture of N,N',N'''-tris{2,4-bis-[(1-hydrocarbyloxy-2,2,6,6-tetrameth-ylpiperidin-4-yl)alkylamino]-s-triazin-6-yl}-3,3'-ethylene-diiminodipropylamine; N,N',N''-tris{2,4-bis[(1-hydrocarbyloxy-2,2,6,6-tetramethylpiperidin-4-yl)alkylamino]-s-triazin-6-yl}-3,3'-ethylene diiminodipropylamine, and bridged derivatives as described by Formulas I, II, IIA, and III, $R_1NH$—$CH_2CH_2CH_2NR_2CH_2CH_2NR_3CH_2CH_2CH_2NHR_4$ (I)

T-$E_1$-$T_1$ (II)

T-$E_1$ (IIA)

G-$E_1$-$G_1$-$E_1$-$G_2$ (III)

where in the tetraamine of Formula I,
$R_1$ and $R_2$ are the s-triazine moiety E, and one of $R_3$ and $R_4$ denotes the s-triazine moiety E with the other of $R_3$ or $R_4$ being hydrogen,
E denotes

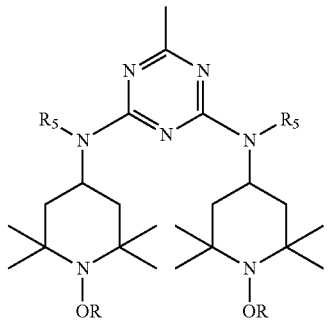

R denotes methyl, propyl, cyclohexyl or octyl,
$R_5$ denotes an alkyl having 1 to 12 carbon atoms,
where in the compound of Formula II or IIA, when R denotes propyl, cyclohexyl or octyl,
T and $T_1$ are each substituted by $R_1$-$R_4$ as defined for Formula I, where
(1) one of the s-triazine moieties E in each tetraamine is replaced by the group $E_1$, which forms a bridge between two tetraamines T and $T_1$,
$E_1$ denotes

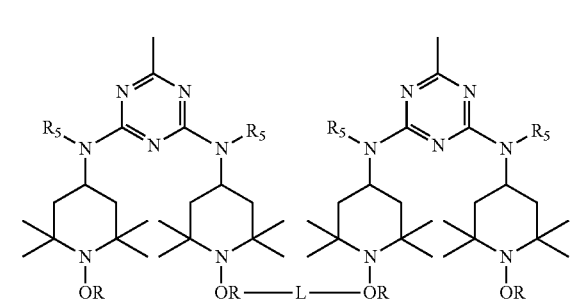

or
(2) the group $E_1$ can have both terminals in the same tetraamine T as in Formula IIA, where two of the E moieties of the tetraamine are replaced by one $E_1$ group, or
(3) all three s-triazine substituents of tetraamine T can be $E_1$, such that one $E_1$ links T and $T_1$, and a second $E_1$ has both terminals in tetraamine T;

L denotes propanediyl, cyclohexanediyl or octanediyl;
where in the compound of Formula III, G, $G_1$, and $G_2$ are each tetraamines substituted by $R_1$-$R_4$ as defined for Formula I, except that G and $G_2$ each have one of the s-triazine moieties E replaced by $E_1$, and $G_1$ has two of the triazine moieties E replaced by $E_1$, such that there is a bridge between G and $G_1$ and a second bridge between $G_1$ and $G_2$; with said mixture being prepared by reacting two to four equivalents of 2,4-bis[(1-hydrocarbyloxy-2,2,6,6-piperidin-4-yl)butylamino]-6-chloro-s-triazine with one equivalent of N,N'-bis(3-aminopropyl)ethylene diamine;

or the hindered amine denotes a compound of Formula IIIb

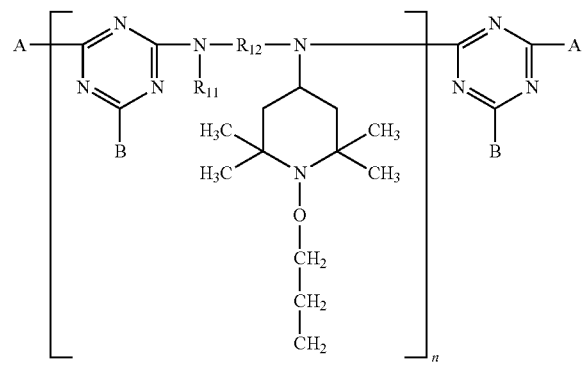

(IIIb)

in which the index n ranges from 1 to 15;
$R_{12}$ denotes $C_2$-$C_{12}$ alkylene, $C_4$-$C_{12}$ alkenylene, $C_5$-$C_7$ cycloalkylene, $C_6$-$C_7$ cycloalkylene-di($C_1$-$C_4$ alkylene), $C_1$-$C_4$ alkylenedi($C_5$-$C_7$cycloalkylene), phenylenedi ($C_1$-$C_4$ alkylene) or $C_4$-$C_{12}$ alkylene interrupted by 1,4-piperazinediyl, —O—, or >N—$X_1$, with $X_1$ being $C_1$-$C_{12}$ acyl or ($C_1$-$C_{12}$ alkoxy)carbonyl or having one of the definitions of $R_{14}$ given below except hydrogen; or $R_{12}$ denotes a group of the Formula (Ib') or (Ic');

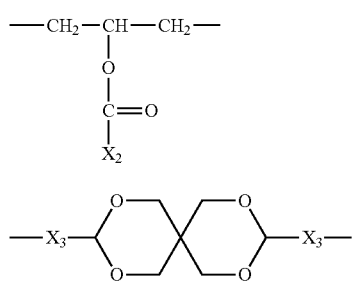

(Ib')

(Ic')

and m being 2 or 3,
with $X_2$ being $C_1$-$C_{18}$ alkyl, $C_5$-$C_{12}$ cycloalkyl that is unsubstituted or substituted by 1, 2 or 3 $C_1$-$C_4$ alkyls; phenyl that is unsubstituted or substituted by 1, 2 or 3 $C_1$-$C_4$ alkyls or $C_1$-$C_4$ alkoxys; $C_7$-$C_9$ phenylalkyl that is unsubstituted or substituted on the phenyl by 1, 2 or 3 $C_1$-$C_4$ alkyls; and
the $X_3$ residues independently denoting $C_2$-$C_{12}$ alkylene;
$R_{13}$, $R_{14}$, and $R_{15}$, which are identical or different, are hydrogen, $C_1$-$C_{18}$ alkyl, $C_5$-$C_{12}$ cycloalkyl that is unsubstituted or substituted by 1, 2, or 3 $C_1$-$C_4$ alkyl; $C_3$-$C_{18}$ alkenyl, phenyl that is unsubstituted or substituted by 1, 2 or 3 $C_1$-$C_4$ alkyls or $C_1$-$C_4$ alkoxys; $C_7$-$C_9$ phenylalkyl that is unsubstituted or substituted on the phenyl by 1, 2, or 3 $C_1$-$C_4$ alkyls; tetrahydrofurfuryl or $C_2$-$C_4$ alkyl that is substituted in the 2, 3, or 4 position by —OH, $C_1$-$C_8$ alkoxy, di($C_1$-$C_4$alkyl)amino or a group of Formula (Ie');

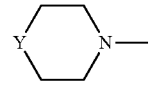

(Ie')

with Y being —O—, —$CH_2$—, —$CH_2CH_2$— or >N—$CH_3$, or —N($R_{14}$)($R_{15}$) additionally denotes a group of Formula (Ie');
the A residues independently denote —$OR_{13}$, —N($R_{14}$)($R_{15}$), or a group of Formula (IIId)

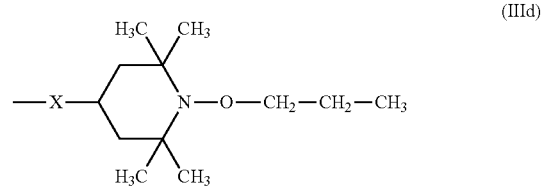

(IIId)

X denotes —O— or >N—$R_{16}$;
$R_{18}$ denotes hydrogen, $C_1$-$C_{18}$ alkyl, $C_3$-$C_{18}$ alkenyl, a $C_5$-$C_{12}$ cycloalkyl that is unsubstituted or substituted by 1, 2, or 3 $C_1$-$C_4$ alkyls; a $C_7$-$C_9$ phenylalkyl that is unsubstituted or substituted on the phenyl by 1, 2, or 3 $C_1$-$C_4$ alkyls; tetrahydrofurfuryl, a group of the Formula (IIIf),

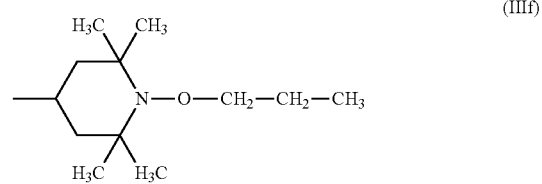

(IIIf)

or $CO_2$—$C_4$ alkyl that is substituted in the 2, 3, or 4 position by —OH, $C_1$-$C_6$ alkoxy, di($C_1$-$C_4$ alkyl)amino, or a group of the Formula (Ie');
$R_{11}$ as one of the definitions given for $R_{16}$; and
the B residues independently have one of the definitions given for A.

In connection with the present invention, the substituents specified in the following definitions have the following meaning:

the alkyl is straight or branched and denotes for example methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl, or n-octadecyl.

Cycloalkyl groups include cyclopentyl and cyclohexyl; typical cycloalkenyl groups include cyclohexyl.

According to a common embodiment of the invention, the one or more phosphonate compound(s) of component (A) are one or more phosphonate compound(s) of the following Formula

where $A^1$ and $A^2$ independently denote a substituted or unsubstituted straight or branched chain alkyl group having 1 to 4 carbon atoms, a substituted or unsubstituted benzyl, a substituted or unsubstituted phenyl, or a substituted or unsubstituted naphthyl. According to an embodiment of the invention, the alkyl group may be a haloalkyl group that is substituted with one, two, or three halogen atoms selected from chlorine and bromine. Furthermore, this may be a phenyl or a halogen-substituted phenyl group such as 4-chlorophenyl, 2,4-dichlorophenyl, 2,4,6-trichlorophenyl, 4-bromophenyl, 2,4-dibromophenyl, or 2,4,6-tribromophenyl. Moreover, $A^1$ and $A^2$ may independently denote phenylalkyl having 7 to 9 carbon atoms or phenylalkenyl having 8 to 10 carbon atoms, which may be substituted in the alkyl residue. Further phosphonate compounds of the above formulas are disclosed in U.S. Pat. No. 4,174,343 and DE 26 30 693, the disclosures of which are incorporated herein by reference.

According to a further preferred embodiment of the invention, the phosphonate compound (A) contained in the flame-retardant composition is a composition of the following structural Formula

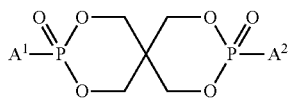

wherein $A^1$ and $A^2$ independently denote an alkyl having 1 to 4 carbon atoms, preferably a methyl group, an ethyl group or a propyl group, with an alkyl having 1 to 2 carbon atoms being particularly preferable and a methyl group being most preferable. In a particularly preferred embodiment, the phosphonate is dimethylspirophosphonate, in which the substituents $A^1$ and $A^2$ of the aforementioned Formula are methyl groups.

According to a common embodiment of the invention, the one or more phosphonate compound(s) of component (A) are one or more phosphonate compound(s) of Formula

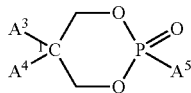

wherein $A^3$ and $A^4$ independently denote methyl or ethyl and $A_5$ denotes a straight or branched chain alkyl group having 1 to 4 carbon atoms or a phenyl or benzyl group, each of which may have up to 3 methyl groups. According to a preferred embodiment of the invention, the compound or compound(s) of the above formula is/are a compound that is disclosed in U.S. Pat. No. 4,228,063, U.S. Pat. No. 3,966,894, and U.S. Pat. No. 512,373. The compounds disclosed in these documents are included by reference in the disclosure of the present invention.

According to a more preferred embodiment of the invention, the one or more phosphonate compound(s) are compounds of the following Formula

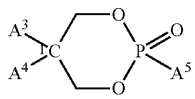

wherein $A^3$ and $A^4$ independently denote methyl or ethyl and $A^5$ denotes a straight or branched chain alkyl group having 1 to 4 carbon atoms or a phenyl or benzyl group that may have up to 3 methyl groups each. According to a preferred embodiment of the invention, $A^3$ and $A^4$ are methyl groups and $A^5$ denotes an alkyl group having 1 to 3 carbon atoms. According to a particularly preferred embodiment of the invention, all three substituents $A^3$, $A^4$, and $A^5$ are methyl groups.

According to another preferred embodiment of the invention, the phosphonate compound contained in the mixture or in the flame-retardant composition is an alkylphosphonic acid, and particularly preferably a methane phosphonic acid, ethane phosphonic acid, propane phosphonic acid, or a derivative thereof such as a salt or ester thereof. In this case, the salt may be an ammonium salt, guanidinium salt, DCDA, guanylurea, melamine, ethylene diamine or a piperazine salt. If the methane phosphonic acid is in the form of an ester, this may be an alkylester having 1 to 3 carbon atoms. It should preferably be a methyl-, ethyl-, propyl- or trimethylol propane, substituted or unsubstituted aryl, substituted or unsubstituted benzyl, or substituted or unsubstituted phenyl ester of the alkyl phosphonic acid. Preferred examples include the following commercially available esters, such as 3-(dimethylphosphono)-propionic acid-methylolamide, available under the trade name Amgard CU from Rhodia Inc. AFLAMMIT KWB from THOR GmbH, Speyer, Amgard CT from Rhodia Inc., AFLAMMIT PE conc. from THOR GmbH, Speyer, Amgard V 490 from Rhodia Inc., AFLAMMIT TL 1002 from THOR GmbH, Speyer, Fyrol PMP from Akzo, FRX 100 from FRX Polymers, Levagard DMPP from Clariant, and Exolit OP 560 from Clariant. According to another common embodiment of the invention, the phosphonate compound contains a phenylphosphonic acid, e.g. Fyrol PMP, available from Akzo Nobel, or FRX 100, available from FRX Polymers.

According to an embodiment of the invention, the mixture or the flame-retardant composition of the invention also includes one or more radical formers.

In the framework of the present invention, the term radical former is understood to denote a compound capable of releasing a radical compound by chemical or physical means. It is preferable that the radical compound here involves a Br radical, Cl radical, or H radical. An example of this type of radical compound is a compound that can release bromine and/or chlorine and/or hydrogen in the form of the respective free radical. According to a preferred embodiment of the invention, the radical former is $NH_4Br$ or $NH_4Cl$. The radical former may be either an inorganic or an organic compound. According to another embodiment of the invention, the radical former can involve a halogenated flame retardant. According to another embodiment of the invention, the 1,3,5-triazine compounds (B) are used in the form of their hydrobromines or hydrochlorides.

The amount of the radical former with respect to the 1,3,5-triazine compound(s) B can vary over a wide range. The amount is generally selected in such a manner that 0.001 to 1,000 mol of the radicals, and preferably 0.01 to 100 mol, are formed per mole of the 1,3,5-triazine compound, with an amount of 0.1 to 10 mol of radicals being particularly preferred.

According to an embodiment of the invention, the 1,3,5-triazine compound (B) contained in the flame-retardant composition is melamine, according to a preferred embodiment of the invention in combination with a radical former. According to a particularly preferred embodiment of the invention, the 1,3,5-triazine compound, i.e. the melamine, is in the form of the hydrobromide or hydrochloride.

According to another embodiment of the invention, the 1,3,5-triazine compound (B) contained in the flame-retardant composition is melamine cyanurate, according to a preferred embodiment of the invention in combination with a radical former.

According to another embodiment of the invention, the 1,3,5-triazine compound (B) contained in the flame-retardant composition is melamine phosphate, according to a preferred embodiment of the invention in combination with a radical former.

According to another embodiment of the invention, the 1,3,5-triazine compound (B) contained in the flame-retardant composition is dimelamine phosphate, according to a preferred embodiment of the invention in combination with a radical former.

According to another embodiment of the invention, the 1,3,5-triazine compound (B) contained in the flame-retardant composition is melamine pyrophosphate and/or melamine polyphosphate, according to a preferred embodiment of the invention in combination with a radical former.

According to another embodiment of the invention, the 1,3,5-triazine compound (B) contained in the flame-retardant composition is poly-[2,4-(piperazin-1,4-yl)-6-morpholin-4-yl]-1,3,5-triazine], known under the trade name ppm-Triazine™, available from Evonik Industries. According to a preferred embodiment of the invention, the poly-[2,4-(piperazin-1,4-yl)-6-morpholin-4-yl]-1,3,5-triazine] is used in combination with a radical former.

According to another embodiment of the invention, the 1,3,5-triazine compound (B) contained in the flame-retardant composition is tris-2-hydroxyethyl isocyanurate, known under the trade name THEIC™, available from BASF SE. Compositions containing tris-2-hydroxyethyl isocyanurate and one or more compounds of Group Aa) and/or Ab) also stand out for their usefulness as hot-melt adhesives.

According to another embodiment of the invention, the 1,3,5-triazine compound (B) contained in the flame-retardant composition is a hindered amine compound having above Formula I, II, III, IV, V, VI, VII, VIII, IX, X, or XI.

According to another embodiment of the invention, the 1,3,5-triazine compound (B) contained in the flame-retardant composition is a compound available under the trade names Budit 310, Budit 311, Budit 312, Budit 314, and Budit 3141 from Budenheim KG, Germany, or PPM Triazine from Evonik Industries, Germany. According to a preferred embodiment of the invention, the aforementioned compounds may be used in combination with a radical former.

According to another embodiment of the invention, the 1,3,5-triazine compound (B) contained in the flame-retardant composition is a hindered amine compound marketed under the trade name FLAMESTAB NOR 116 by Ciba. This flame-retardant agent is disclosed in EP 0 889 085, the disclosures of which are incorporated herein by reference. Flamestab NOR comprises one or more compound(s) selected from the group

(I)

(II)

(IIA)

(III), where in the tetraamine of Formula I
$R_1$ and $R_2$ denote the s-triazine moiety E; and one of $R_3$ and $R_4$ denotes the s-triazine moiety E, with the other of $R_3$ and $R_4$ denoting hydrogen, where E denotes

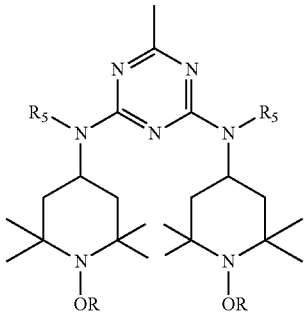

R denotes cyclohexyl,
$R_5$ denotes an alkyl having 1 to 12 carbon atoms,
where in the compound of Formula II or IIA, when R denotes cyclohexyl, T and $T_1$ are each a tetraamine substituted by $R_1$-$R_4$ as defined for Formula I, where
(1) one of the s-triazine moieties E in each tetraamine is replaced by the group $E_1$ which forms a bridge between two tetraamines T and $T_1$,
$E_1$ is

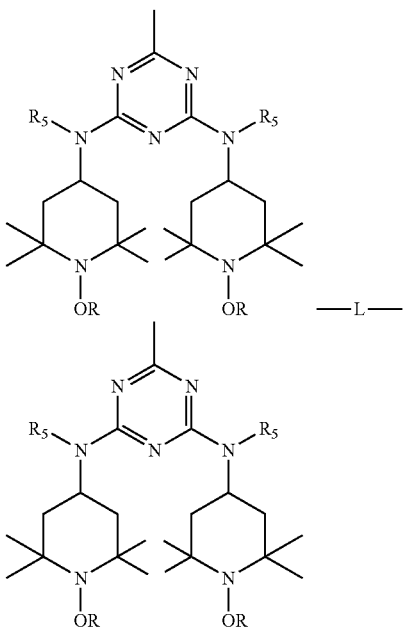

The hindered amine compounds shown above according to Formulas I, II, IIA, and III can also contain a mixture of N,N',N'''-tris{2,4-bis[(1-hydrocarbonoxy-2,2,6,6-tetramethylpiperidin-4-yl)alkylamino]-s-triazin-6-yl}-3,3'-ethylene diiminodipropylamine; and N,N',N''-tris{2,4-bis[(1-hydrocarbonoxy-2,2,6,6-tetramethylpiperidin-4-yl)alkylamino]-s-triazin-6-yl}-3,3'-ethylene diiminodipropylamine.

The combination of the above-defined 1,3,5-triazine compound(s) (Flamestab NOR™) with the dimethylspirophosphonate (A) provides a synergistic flame-resistant compound that shows high efficacy even when used in small amounts.

The synergistic effect of the flame-resistant composition of the invention is clearly greater than the commonly observed additive effect of the individual Components (A) and (B). For example, it was surprisingly found that by concomitantly using Components (A) and (B) as flame-resistant components, it becomes possible to use these components to impart flame resistance to plastics in substantially lower amounts than in the case of an additive effect.

A flame-retardant composition comprising Components (A) and (B) in the weight ratios given below is referred to in the following as a "flame-retardant composition according to the invention." A "flame-retardant composition according to the invention" may contain one or more additional components other than Components (A) and (B) as flame-retardant components in the weight ratios specified below. The additional component or components may have a flame-retardant action, or they may have no flame-retardant action, e.g., they could be an additive for example.

In another embodiment of the invention, the flame-retardant composition according to the invention essentially comprises Components (A) and (B) as flame-retardant active components, i.e., in addition to Components (A) and (B), the composition may contain one or more other flame-retardant components, but these must be present in amounts such that they do not make any contribution to the overall effect of the resulting mixture. This means that if the flame-retardant effect of a flame-retardant composition according to the invention that—in addition to Components (A) and (B) as essential constituents—also contains one more additional flame-retardant components in subordinate or minor concentrations is not modified with respect to use of the flame-retardant composition of the invention, this will be described in connection with the present invention with the wording "essentially comprising."

In another embodiment, the flame-retardant composition may comprise Components (A) and (B) as its only flame-retardant components. In such a case, it is only possible for one or more additional components not having a flame-retardant effect to be present, for example, common additives that are described in greater detail below.

The ratio (in parts by weight) of Compound(s) (A) to Compound or Compounds (B) is selected in such a manner that the flame-retardant effect of the two components is synergistic. In this case, for example, the ratio in the composition is between 1:100 and 100:1, and preferably in the range of 1:10 to 10:1, with a range of 3:7 to 7:1 being particularly preferred. In this case, the amount of Component (A) and Component (B) used also depends on the efficacy of the particular compound(s) and the particular area of application.

The composition according to the invention may also include acid scavengers. Examples of acid scavengers include hydrotalcite and amorphous basic aluminum magnesium carbonates such as those described in U.S. Pat. No. 4,427,816 and U.S. Pat. No. 5,234,981. Hydrotalcite is also known as Hycite or DHT4A. The hydrotalcites can be natural or synthetic. It is assumed that natural hydrotalcite will have the structure $Mg_6Al_2(OH)_{18}CO_3 \times 4H_2O$.

The flame-retardant composition according to the invention or the polymer containing this flame-retardant composition according to the invention may also contain additives. One example of such additives are acid scavengers, which may be present in the polymer composition for example in an amount of 0.1 to 1.0% by weight with respect to the weight of the polymer composition. For example, these acid scavengers may be present in the amount of 0.2 to 0.8 or 0.4 to 0.6% by weight with respect to the weight of the polymer composition.

In this case, the acid scavengers support the present composition in color, odor, and stability.

The polymers or polymer compositions or the flame-retardant composition according to the present invention may also contain additional additives. These additional additives are chiefly obtained from the group of the heat stabilizers and/or light stabilizers. In this case, thermal stabilization includes both processing and use (long-term stability). Such additives are known to a person skilled in the art, and most of them are commercially available. Examples of suitable additives include the following:

Antioxidants such as alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonyl phenols that are linear or branched in the side chains, for example 2,6-di-nonyl-4-methylphenol, 2,4-dimethyl-6-(1'-methylundec-1'-yl)phenol, 2,4-di-methyl-6-(1'-methylheptadec-1'-yl) phenol, 2,4-dimethyl-6-(1'-methyltridec-1'-yl)phenol, and mixtures thereof.

Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, and 2,6-didodecyl-thiomethyl-4-nonylphenol.

Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, and bis-(3,5-di-tert-butyl-4-hydroxyphenyl)adipate.

Tocopherols, for example α-tocopherol, β-tocopherol, γ-tocopherol, δ-tocopherol, and mixtures thereof (vitamin E).

Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis (6-tert-butyl-2-methylphenol). 4,4'-thiobis-(3,6-di-sec-amylphenol), 4,4'-bis(2,6-dimethyl-4-hydroxyphenyl)disulfide.

Alkylidene bisphenols, for example 2, 2'-methylenebis(6-tert-butyl-4-methylphenol), 2,2'-methylenebis(6-tert-butyl-4-ethylphenol), 2,2'-methylenebis[4-methyl-6-α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis(2, 6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, and 1,1,5,5-tetra-(5-tert-butyl-4-hydroxy-2-methylphenyl)pentane.

O-, N- and S-benzyl compounds, for example 3, 5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3- hydroxy-2,6-dimethylbenzyl)dithioterephthalate, bis(3,5-di-tert-butyl-4-hydroxybenzyl)sulfide, and isooctyl-3,5-di-tert-butyl-4-hydroxybenzylmercaptoacetate.

Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, and bis[4-(1,1,3,3-tetramethylbutyl)phenyl]-2,2-bis(3,5-di-tert-butyl-4-hydroxybenzyl)malonate.

Aromatic hydroxybenzyl compounds, for example 1, 3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, and 2,4,6-tris(3,5-di-tert-butyl-4-hydroxybenzyl)phenol.

Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1, 3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, and 1,3,5-tris(3,5-dicyclohexyl-4-hydroxybenzyl)isocyanurate.

Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, and the calcium salt of the monoethyl ester of 3,5-di-tert-butyl-4-hydroxybenzylphosphonic acid.

Acylaminophenols, for example 4-hydroxylauranilide, 4-hydroxystearanilide, and octyl N-(3,5-di-tert-butyl-4-hydroxyphenyl)carbamate.

Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexane diol, 1,9-nonane diol, ethylene glycol, 1,2-propane diol, neopentyl glycol, thiodiethylene glycol, diethylene glycol, triethylene glycol, pentaerythritol, tris(hydroxyl-ethyl)isocyanurate, N,N'-bis(hydroxyethyl)oxamide, 3-thiaundecanol, 3-thiapentadecanol, trimethylhexane diol, trimethylol propane, and 4-Hydroxymethyl-1-phospha-2,6,7-trioxabicyclo[2,2,2]octane.

Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexane diol, 1,9-nonane diol, ethylene glycol, 1,2-propane diol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexane diol, trimethylol propane, and 4-hydroxymethyl-1-phospha-2,6,7-trioxabicyclo[2.2.2]octane.

Esters of β-(3,5-dicyclohexyl-4-hydroxyphenyl)propionic acid with mono- or polyhydric alcohols, e.g. with methanol, ethanol, octanol, octadecanol, 1,6-hexane diol, 1,9-nonane diol, ethylene glycol, 1,2-propane diol, neopentyl glycol, thiodiethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexane diol, trimethylolpropane, and 4-hydroxymethyl-1-phospha-2,6,7-trioxabicyclo[2.2.2]octane.

Esters of 3,5-di-tert-butyl-4-hydroxyphenyl acetic acid with mono- or polyhydric alcohols, e.g. with methanol, ethanol, octanol, octadecanol, 1,6-hexane diol, 1,9-nonane diol, ethylene glycol, 1,2-propane diol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexane diol, trimethylolpropane, and 4-hydroxymethyl-1-phospha-2,6,7-trioxabicyclo[2.2.2]octane.

Amides of β-(3,5-di-tert-butyl-4-hydroxyphenyl)propionic acid, e.g. N,N'-bis(3,5-di-tert-butyl-4-hydroxyphenylpropionyl)hexamethylene diamide, N,N'-bis(3,5-di-tert-butyl-4-hydroxy-phenylpropionyl)trimethylene diamide, N,N'-bis(3,5-di-tert-butyl-4-hydroxyphenylpropionyl)-hydrazide, and N,N'-bis[2-(3-[3,5-di-tert-butyl-4-hydroxyphenyl]propionyloxy)ethyl]oxamide (Naugard® XL-1 supplied by Uniroyal).

Ascorbic Acid (vitamin C).

Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyidiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example, p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono-und dialkylated tert-butyldiphenylamines, 2,3-dihydro-3,3-dimethyl-4H-1,4-benzothiazine, phenothiazine, a mixture of mono-und dialkylated tert-butyl/tert-octylphenothiazines, a mixture of mono-und dialkylated tert-octyl-phenothiazines, N-allylphenothiazine, N,N,N',N'-tetraphenyl-1,4-diaminobut-2-ene, N,N-bis-(2,2,6,6-tetramethyl-piperid-4-yl)-hexamethylenediamine, bis(2,2,6,6-tetramethylpiperid-4-yl)-sebacate, 2,2,6,6-tetramethylpiperidin-4-one, and 2,2,6,6-tetramethylpiperidin-4-ol.

UV absorbers and light stabilizers, such as 2-(2-hydroxyphenyl)-2H-benzotriazoles, for example known commercial hydroxyphenyl-2H-benzotriazoles and benzotriazoles as disclosed in U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450; 5,278,314; 5,280,124; 5,319,091; 5,410,071; 5,436,349; 5,516,914; 5,554,760; 5,553,242; 5,574,166; 5,607,987, 5,977,219 and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole, and 5-phenylsulfonyl-2-(2-hydroxy-3,5-di-t-butylphenyl)-2H-benzotriazole.

2-Hydroxybenzophenones, for example the 4-hydroxy, 4-methoxy, 4-octyloxy, 4-decyloxy, 4-dodecyloxy, 4-benzyloxy, 4,2',4'-trihydroxy, and 2'-hydroxy-4,4'-dimethoxy derivatives.

Esters of substituted and unsubstituted benzoic acids, such as 4-tert-butyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, and 2-methyl-4,6-di-tert-butylphenyl 3,5-di-tert-butyl-4-hydroxybenzoate.

Acrylates, for example ethyl-α-cyano-β,β-diphenylacrylate, isooctyl-α-cyano-Rβ,β-diphenylacrylate, methyl-α-carbomethoxycinnamate, methyl-α-cyano-β-methyl-p-methoxy-cinnamate, butyl-α-cyano-β-methyl-p-methoxy-cinnamate, methyl-α-carbomethoxy-p-methoxycinnamate and N-(β-carbomethoxy-β-cyanovinyl)-2-methylindoline.

Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine, or N-cyclohexyldiethanolamine, nickel dibutyldithiocarbamate, nickel salts of the monoalkyl esters, e.g. the methyl or ethyl ester of 4-hydroxy-3,5-di-tert-butylbenzylphosphonic acid, nickel complexes of ketoximes, e.g. of 2-hydroxy-4-methylphenyl undecylketoxime, and nickel complexes of 1-phenyl-4-lauroyl-5-hydroxypyrazole, with or without additional ligands.

Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensates of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxymethylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'- di-tert-butoxanilide, mixtures of o- and p-methoxy-disubstituted oxanilides and mixtures of o- and p-ethoxy-disubstituted oxanilides.

2-(2-Hydroxyphenyl)-1,3,5-triazines, for example known commercial tris-aryl-o-hydroxyphenyl-s-triazines and triazines as disclosed in WO 96/28431 and U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,736,597; 5,942,626; 5,959,008; 5,998,116; 6,013,704; 6,060,543; 6,187,919; 6,242,598 and 6,255,483, for example 4,6-bis-(2,4-dimethylphenyl)-2-(2-hydroxy-4-octyloxyphenyl)-s-triazine, Cyasorb® 1164, Cytec Corp, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)-phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylisopropylideneoxy-phenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, a mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylhexyloxy)-2-hydroxypropoxy)-phenyl)-s-triazine, and 4,6-diphenyl-2-(4-hexyloxy-2-hydroxyphenyl)-s-triazine.

Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyl-dibenzo[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 2,2',2''-nitrilo[triethyltris(3,3',5,5'-tetra-tert-butyl-1,1'-biphenyl-2,2',diyl)phosphite], 2-ethylhexyl(3,3',5,5'-tetra-tert-butyl-1,1'-biphenyl-2,2'-diyl)phosphite.

Especially preferred are the following phosphites: Tris(2,4-di-tert-butylphenyl)phosphite (Irgafos® 168, Ciba-Geigy) and tris(nonylphenyl)phosphite.

(A)

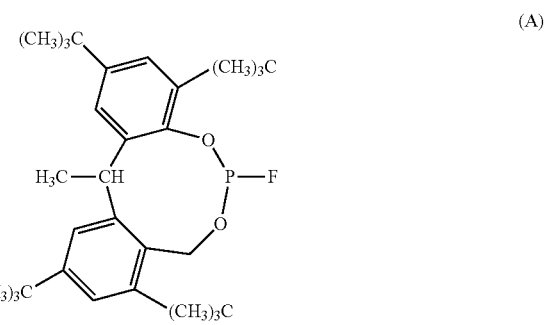

(B)

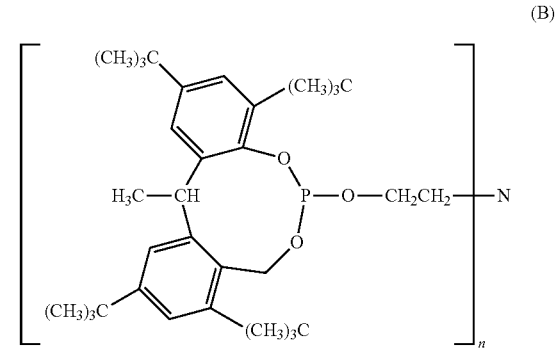

(C)

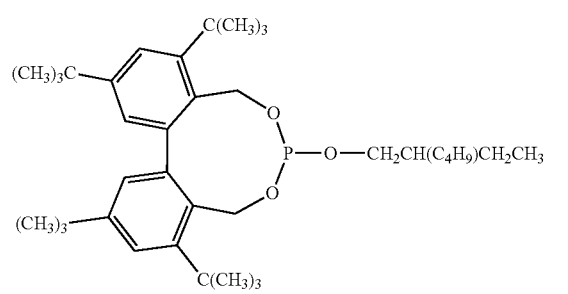

(D)

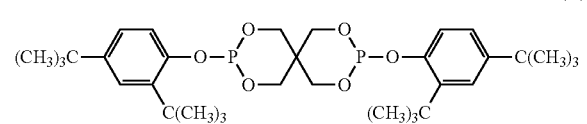

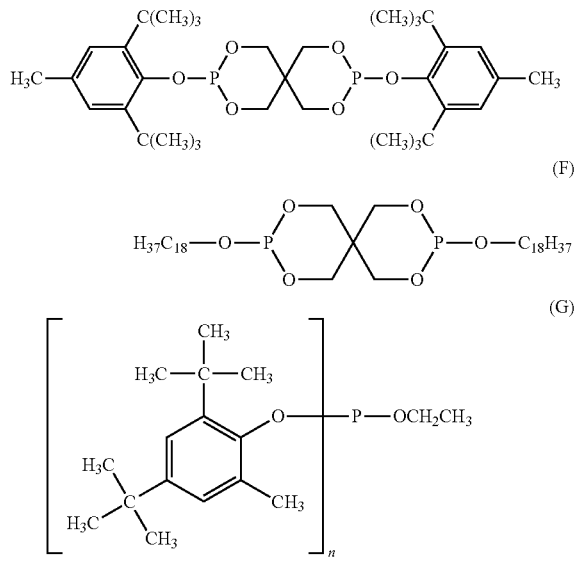

Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, and N,N-dialkylhydroxylamine derived from hydrogenated tallow amine.

Nitrones, for example, N-benzyl-α-phenyl-nitrone, N-ethyl-α-methyl-nitrone, N-octyl-α-heptyl-nitrone, N-lauryl-α-undecyl-nitrone, N-tetradecyl-α-tridcyl-nitrone, N-hexadecyl-α-pentadecyl-nitrone, N-octadecyl-α-heptadecyl-nitrone, N-hexadecyl-α-heptadecyl-nitrone, N-octadecyl-α-pentadecyl-nitrone, N-heptadecyl-α-heptadecyl-nitrone, N-octadecyl-α-hexadecyl-nitrone, and nitrone derived from N,N-dialkylhydroxylamine derived from hydrogenated tallow amine.

Thiosynergists, for example, dilauryl thiodipropionate or distearyl thiodipropionate.

Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, and pentaerythritol tetrakis(β-dodecylmercapto) propionate.

Polyamide stabilizers, for example, copper salts in combination with iodides or phosphorus compounds and salts of divalent manganese.

Basic co-stabilizers, for example, melamine, polyvinylpyrrolidone, dicyandiamide, triallylcyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate, or zinc pyrocatecholate.

Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butyl-benzoic acid, adipic acid, diphenylacetic acid, sodium succinate or sodium benzoate; and polymeric compounds such as ionic copolymers (ionomers).

Fillers and reinforcing agents, for example, calcium carbonate, silicates, glass fibers, glass bulbs, asbestos, talc, kaolin, mica, barium sulfate, metal oxides and hydroxides, carbon black, graphite, wood flour and flours or fibers of other natural products, and synthetic fibers.

Other additives, for example, plasticizers, lubricants, emulsifiers, pigments, rheology additives, catalysts, flow-control agents, optical brighteners, flameproofing agents, antistatic agents, and blowing agents.

Benzofuranones and indolinones, for example those disclosed in U.S. Pat. No. 4,325,863; U.S. Pat. No. 4,338,244, U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butylbenzofuran-2-one, 3-(3,4-dimethylphenyl)-5,7-di-tert-butyl-benzofuran-2-one, and 3-(2,3-dimethylphenyl)-5,7-di-tert-butyl-benzofuran-2-one.

Examples of suitable lubricants include montan wax, fatty acid esters, PE waxes, amide waxes, polyol partial esters, partially saponified PE waxes, so-called complex ester chloroparaffins, glycerol esters, and alkaline earth metal soaps or fatty ketones, such as described in DE4204887. Suitable lubricants are also described in "Taschenbuch der Kunststofadditive", editors R. Gachter and H. Muller, Hanser Verlag, $3^{rd}$ edition, 1990, pages 443-503. Other lubricant embodiments, in particular combinations of lubricants, are to be found in EP 0 062 813 and EP 0 336 289.

The present composition can additionally contain another UV absorber selected from the group consisting of the s-triazines, the oxanilides, the hydroxybenzophenones, benzoates and the α-cyanoacrylates. Specifically, the present composition may additionally contain an effective stabilizing amount of at least one other 2-hydroxyphenyl-2H-benzotriazole, another tris-aryl-s-triazine, or a hindered amine or mixtures thereof. For example, additional components are selected from pigments, dyes, plasticizers, antioxidants, thixotropic agents, leveling auxiliaries, basic costabilizers, additional light stabilizers such as UV absorbers or sterically hindered amines, metal passivators, metal oxides, organophosphorus compounds, hydroxylamines, and mixtures thereof, particularly pigments, phenolic antioxidants, calcium stearate, zinc stearate, phosphite and phosphonite stabilizers, UV absorbers of the 2-(2'-hydroxyphenyl)benzotriazole and 2-(2-hydroxyphenyl)-1,3,5-triazine classes, and sterically hindered amines.

The present invention also concerns the use of the flame-retardant composition of the invention for flame-retardant finishing of polymers or polymer blends. In this case, the polymer or polymer substrate can be any of a wide variety of polymer types, including polyolefins, polyesters, polyamides, or ABS polymers. Highly preferred polymers are polypropylene, polyethylene, thermoplastic olefin (TPO), ABS, and high-impact polystyrene; particularly preferred polymers are polypropylene, polyethylene, and thermoplastic olefin (TPO), thermoplastic polyurethane elastomers (TPU), polyvinylchloride (PVC), polyvinyl acetate (PVA), ethyl vinyl acetate (EVA), polyester resins (UP-Resins), polyureas, and polyurethanes.

The effective flame-retardant amount of the flame-retardant composition according to the invention is the amount required to show a flame-retardant effect, and this amount is measured by means of one of the standard procedures used for evaluation of flame-retarding properties. These include the NFPA 701 Standard Procedure for Flame Testing of Flame-Resistant Textiles and Films, 1989 and 1996 Editions; the Electro-UL 94-Test for Flammability of Plastic Materials for Components in Equipment and Devices, 5th Edition, 29 Oct. 1996, Limiting Oxygen Index (LOI), ASTM-D2863, and Cohen calorimetry ASTM E-1354. Moreover, the standards for buildings (DIN4102B1) and motor vehicles (MVSS 302) may be used to investigate the flame-retardant properties of the flame-retardant composition according to the invention.

The present invention thus also concerns a flame-retardant composition comprising:
(a) a polymer and
(b) an effective flame-retardant amount of the synergistic flame-retardant composition according to the invention.

The effective flame-retardant amount of the flame-retardant composition should appropriately be 0.1 to 60% by weight with respect to the polymer, and preferably 0.5 to 30% by weight, with an amount of 1 to 10% by weight being particularly preferred.

The flame-retardant polymers containing the flame-retardant compositions according to the invention may be manufactured by means of known methods, for example by mixing the aforementioned additives and optionally additional additives with the polymer using equipment such as calenders, mixers, kneaders, extruders and the like. The additives may be added individually or mixed with one another. It is also possible to use so-called masterbatches. In such processes, for example, the polymer may be used in the form of powders, granulates, solutions, suspensions, or in the form of lattices. The finished polymer compositions obtained in this manner, which have been made flame-retardant, can be made into the desired form by means of known methods. Such methods include calendering, extruding, injection molding, spray coating, flexiblade coating, spinning, compression melting, rotary molding, thermoforming, or extrusion blowing. The finished flame-retardant polymer can also be processed into foamed objects.

Examples of polymer objects manufactured in this manner include fibers, films and foils, molded objects, and foamed molding products.

The additives according to the invention and optionally other components may be added to the polymer material individually or mixed with one another. If desired, the individual components may be mixed with one another before being added to the polymer, for example by dry mixing, compacting, or in a smelter.

According to another embodiment, the invention concerns a process for imparting flame-retardant properties to a polymer, in which the process comprises the addition of Components (A) (one or more diphosphonate compound(s)) and (B) (one or more 1,3,5-triazine compound(s)) to the polymer. In this case, the effective flame-retardant amount of Components (A) and (B) is the amount required to demonstrate flame-retardant efficacy, and this amount can be measured by means of one of the aforementioned standard procedures. The following examples are only given for explanatory purposes and not in any way to limit the scope of the invention. Unless otherwise specified, room temperature refers to a range of 20 to 25° C. Percentages refer to the weight of the polymer substrate, unless otherwise specified.

The following examples explain the invention in further detail.

In order to demonstrate the invention, polyethylene films mixed with various flame-retardant compositions were manufactured.

1. Manufacture of Powder Mixtures:

A precise amount of polyethylene powder, Pallman 500/1 Extruder, and powder mixtures of the flame-retardant agents according to Examples 1 through 23 (for example, 98 g of polymer and 2 g of flame-retardant agent) were mixed and homogenized using a laboratory mixer. The powder mixtures were dried for 2 hours at 80° C.

2. Manufacture of Films:

The films were manufactured on a single-screw extruder 19/25D manufactured by Brabender Corp. at a melt temperature of 210° C. and a rotation speed at which a maximum of 50% of the torque was reached.

In this case, the powder mixtures according to Examples 1 through 23 were manually added using a funnel. The tool used was a broad-band nozzle head 100×0.5 mm, and the discharge belt was adjusted so as to achieve a film width of mm and a thickness of 0.20 mm. Air cooling was then carried out.

3. Assessment of Efficacy

In order to test the flame-retardant agent, the following tests were conducted on the films manufactured according to 2. above:

Determination of the LOI value according to DIN ISO 4589 on an LOI test unit manufactured by Raczek Corp.

Combustion test according to DIN 53438 Part 3.

For these purposes, test pieces measuring 230 mm×90 mm were manufactured. These were then placed vertically in a combustion chamber. Combustion took place on a flat surface with a flame height of 20 mm and a flame angle of 45°.

Note: this DIN corresponds to DIN 4102-B2, provided that the upper measurement mark of the combustion test piece is not reached by the tip of the flame or it goes out on its own.

COMPARISON EXAMPLES 0 AND 1

98 g of polyethylene powder and 0 or 2 g of dimethylspirophosphonate respectively were homogenously mixed according to the above process. A sufficient amount of film to carry out the flame-retardant properties tests was manufactured from this mixture.

EXAMPLES 3 THROUGH 10, 12 AND 13, 15 THROUGH 17, 19, AND 21 THROUGH 23, 25 AND 26 AND COMPARISON EXAMPLES 2, 11, 14, 18, 20, 24, AND 27

Examples and Comparison Examples 2 through 25 were carried out in the same manner, and the results of Examples and Comparison Examples 0 through 25 are summarized in the following Table.

| Expl | Pallmann 500-1 | DMSP* | EAP** | MP*** | NOR 116 | Melamine | Domus BM 41 | Melamine cyanurate | PPM, Triazine | THEIC | LOI (%) | Burn-in depth (mm) |
|---|---|---|---|---|---|---|---|---|---|---|---|---|
| 0 | 100 | — | — | — | — | — | — | — | — | — | 22.0 | Burns off |
| 1 | 98 g | 2 g | — | — | — | — | — | — | — | — | 25 | Burns off |
| 2 | 98 g | — | — | — | 2 g | — | — | — | — | — | 25 | Burns off |
| 3 | 98 g | 1 g | — | — | 1 g | — | — | — | — | — | 28.5 | 100 |
| 4 | 98 g | 0.5 g | — | — | 1.5 g | — | — | — | — | — | 29.2 | 80 |
| 5 | 98 g | 1.5 g | — | — | 0.5 g | — | — | — | — | — | 29.9 | 70 |
| 6 | 98.5 g | 1 g | — | — | 0.5 g | — | — | — | — | — | 28.0 | 80 |
| 7 | 98.7 g | 1 g | — | — | 0.3 g | — | — | — | — | — | 27.5 | 100 |
| 8 | 98 g | — | 2 g | — | — | — | — | — | — | — | 29 | 70 |
| 9 | 98 g | — | 1.5 g | — | 0.5 g | — | — | — | — | — | 33 | 55 |
| 10 | 98.7 g | — | 1 | — | 0.3 | — | — | — | — | — | 30.5 | 60 |
| 11 | 98 g | — | — | 2 | — | — | — | — | — | — | 26.5 | Burns off |
| 12 | 98 g | — | — | 1.5 | 0.5 | — | — | — | — | — | 30.5 | 90 |
| 13 | 98.7 g | — | — | 1 | 0.3 | — | — | — | — | — | 29.0 | 95 |
| 14 | 98 g | — | — | — | — | 2 g | — | — | — | — | 23.7 | Burns off |
| 15 | 98 g | 1 g | — | — | — | 1 g | — | — | — | — | 28.0 | 100 |
| 16 | 98 g | 1.5 g | — | — | — | 0.5 g | — | — | — | — | 29.3 | 90 |
| 17 | 98.7 g | 1 g | — | — | — | 0.3 g | — | — | — | — | 26.9 | 110 |
| 18 | 98 g | — | — | — | — | — | 2 g | — | — | — | 23.5 | Burns off |
| 19 | 98 g | 1 g | — | — | — | — | 1 g | — | — | — | 28.7 | 100 |
| 20 | 98.7 g | 1 g | — | — | — | — | 0.3 g | — | — | — | 27.0 | 110 |
| 21 | 98 g | — | — | — | — | — | — | 2 g | — | — | 23.4 | Burns off |
| 22 | 98 g | 1 g | — | — | — | — | — | 1 g | — | — | 25.9 | 120 |
| 23 | 98.7 | 1 g | — | — | — | — | — | 0.3 g | — | — | 25.1 | 125 |
| 24 | 98 | — | — | — | — | — | — | — | 2 g | — | 23.2 | Burns off |
| 25 | 98.5 | 1 g | — | — | — | — | — | — | 0.5 g | — | 26.8 | 110 |
| 26 | 98.5 g | 1 g | — | — | — | — | — | — | — | 0.5 | 27.5 | 130 |
| 27 | 98.0 g | — | — | — | — | — | — | — | — | 2.0 | 25 | Burns off |

DMSP*: dimethylspirophosphonate
EAP**: Ethylene diamine methane phosphonate
MP***: Melamine methane phosphonate:
Domus HM 41 ™: Melamine hydrobromide
ppm-Triazine ™: Poly-[2,4-(piperazin-1,4-yl)-6-(morpholin-4-yl)-1,3,5-triazine
THEIC: Tris-2-hydroxyethylisocyanurate
NOR 116: FLAMESTAB NOR 116 from Ciba As can be seen from the results shown in Table 1, the foils manufactured according to Comparison Examples 1, 2, 11, 14, 18, 21, 24, and 27 did not show satisfactory results in the combustion tests. One can clearly see from the results of Examples 3 through 10, 12 and 13, 15 through 17, 19, and 21 through 26 that the present invention provides synergistic flame-retardant agents that show a flame-retardant effect compared to use of the individual components, even when used in a low concentration.

For example, this can be clearly shown with reference to Comparison Examples 1 and 2 and Examples 3 through 7. While the use of DMSP (Comparison Example 1) or NOR 116 (Comparison Example 3) in amounts of 2% by weight each yielded an LOI value of 25, the use of 1% by weight each caused the LOI value to increase to a value of 28.5 (Example 3). Even the reduction of a single component, the NOR 116 in Example 7, still led to an LOI value of 27.5, which is distinctly higher than the values of Comparison Examples 1 and 2 (LOI=25 in both cases). This clearly shows that this is a synergistic flame-retardant composition.

The amount of flame-retardant agent with respect to the finished polymer compound that is necessary in order to reach the LOI of the respective individual substance can be sharply reduced by using the synergistic flame-retardant composition. By using this synergistic composition, it is thus possible, based on the low percentage of the flame-retardant composition required, to manufacture thin-walled molding compounds or nonwoven materials that meet the requirements of the necessary fire protection class.

The invention claimed is:

1. A blend comprising a synergistic mixture of (A) and (B), wherein:

(A) is a chemical compound or a mixture of two or more chemical compounds selected from the group consisting of a) one or more phosphonate compound(s) according to the following formula

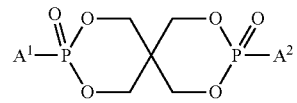

wherein $A^1$ and $A^2$ are each independently of the other a substituted or unsubstituted straight chain or branched chain alkyl group having 1 to 4 carbon atoms, a substituted or unsubstituted benzyl, a substituted or unsubstituted phenyl, or a substituted or unsubstituted naphthyl, and b) alkyl- or aryl-phosphonic acids, wherein alkyl- is a straight chain or branched chain alkyl group having 1 to 4 carbon atoms, and aryl is a substituted or unsubstituted benzyl, substituted or unsubstituted phenyl, substituted or unsubstituted naphthyl, or a salt respectively an ester of the aforesaid phosphonic acid, and (B) is a 1,3,5-triazine compound or a mixture of two or more 1,3,5-triazine compounds selected from the group consisting of hindered amine compounds of the formula I, II, IIA and III:

R₁NH—CH₂CH₂CH₂NR₂CH₂CH₂NR₂CH₂CH₂CH₂NHR₄  (I)

T-E₁-T₁  (II)

T-E₁  (IIA)

G-E₁-G₁-E₁-G₂  (III), where in the tetraamine of formula I
R₁ and R₂ are the s-triazine moiety E; and one of R₃ and R₄ is the s-triazine moiety E, with the other of R₃ and R₄ being hydrogen,
wherein E is

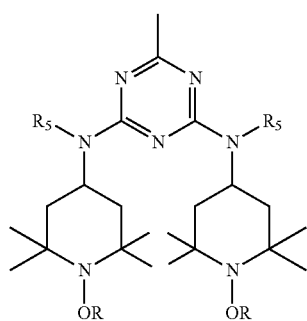

R is methyl, cyclohexyl or octyl,
R₅ is alkyl of 1 to 12 carbon atoms,
wherein in the compound of formula II or IIA, when R is cyclohexyl or octyl, T and T₁ are each a tetraamine substituted by R₁-R₄ as defined for formula I,
where
(1) one of the s-triazine moieties E in each tetraamine is replaced by the group E₁ which forms a bridge between two tetraamines T and T₁; car
(2) the group E₁ can have both termini in the same tetraamine T as in formula IIA where two of the E moieties of the tetraamine are replaced by one E₁ group, or
(3) all three s-triazine substituents of tetraamine T can be E₁ such that one E₁ links T and T₁ and a second E₁ has both termini in tetraamine T, and
E₁ is

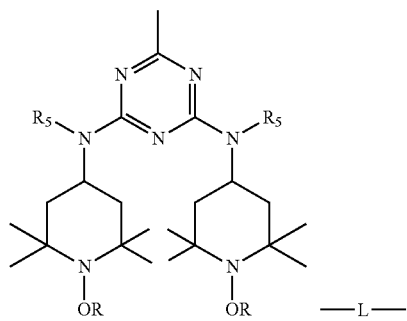

and L denotes propanediyl, cyclohexanediyl or octanediyl;
G, G₁, and G₂ are each tetraamines substituted by R₁-R₄ as defined for Formula J, except that G and G₂ each have one of the s-triazine moieties E replaced by E₁, and G₁ has two of the triazine moieties E replaced by E₁, such that there is a bridge between G and G₁ and a second bridge between G₁ and G₂.

2. The blend according to claim 1, wherein the phosphonate compound being a compound of the following formula

3. The blend according to claim 1 or 2, further comprising N,N',N'''-tris{2,4-bis[(1-hydrocarbyloxy-2,2,6,6-tetramethylpiperidin-4-yl)alkylamino]-s-triazin-6-yl}-3,3'-ethylenediiminodipropylamine and N,N',N'''-tris-{2,4-bis[(1-hydrocarbyloxy-2,2,6,6-tetramethylpiperidin-4-yl)alkylamino]-s-triazin-6-yl}-3,3'-ethylenediiminodipropylamine.

4. The blend according to any one of claims 1 to 3, wherein the phosphonate compound(s) (A) and the 1,3,5-triazine compound(s) (B) are in a ratio of 1:100 up to 100:1.

5. A flame-retardant composition comprising a mixture according to any one of claims 1 to 4 including one or more further component(s), selected from the group consisting of pigments, colorants, softeners, antioxidants, phenolic antioxidants, thixotropic agents, levelling agents, basic co-stabilizers, nitrone stabilizers, amine oxide stabilizers, benzofurane stabilizers, UV-absorbing agents, sterically hindered amines, metal deactivators, metal oxides, hydroxyl amines, drop inhibitors, calcium stearate, zinc stearate, phosphite- and phosphonite stabilizers, benzofuranone stabilizers, UV-absorbing agents of the 2-(2'-hydroxyphenyl)benzotriazole and 2-(2-hydroxyphenyl)-1,3,5-triazine classes, sterically hindered amines and radical formers and mixtures thereof.

6. The polymer moulding material comprising a flame-retardant composition according to claim 5.

7. A process to provide flame retardant properties to a polymer according to claim 1, whereby the process comprises the addition of
a) one or more phosphonate compound(s) and
b) one or more 1,3,5-triazine compound (s).

8. The process according to claim 7 further comprising the addition of a radical former.

9. The polymer, containing a flame-retardant composition according to claim 5.

10. The polymer according to claim 9, said polymer being selected from the group consisting of polyolefins, polyesters, polyamides, ABS-polymers, polypropylene, polyethylene, thermoplastic olefin (TPO), high impact polystyrene, thermoplastic polyurethane-elastomers (TPU), polyvinyl chloride (PVC), polyvinyl acetate (PVA), ethyl-vinyl acetate (EVA), polyester resins (UP-Resins), polyurea and polyurethanes or mixtures of two or more thereof.

11. Articles containing a polymer according to claim 9 or 10, selected from fibres, films, foils, molded objects, and foamed molding products.

* * * * *